(12) United States Patent
Ogawa et al.

(10) Patent No.: US 11,444,525 B2
(45) Date of Patent: Sep. 13, 2022

(54) INVERTER SYSTEM AND INVERTER SYSTEM CONTROL METHOD

(71) Applicant: MEIDENSHA CORPORATION, Tokyo (JP)

(72) Inventors: Ryuichi Ogawa, Numazu (JP); Shizunori Hamada, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/619,331

(22) PCT Filed: Mar. 31, 2020

(86) PCT No.: PCT/JP2020/014732
§ 371 (c)(1),
(2) Date: Dec. 15, 2021

(87) PCT Pub. No.: WO2020/255528
PCT Pub. Date: Dec. 24, 2020

(65) Prior Publication Data
US 2022/0209643 A1    Jun. 30, 2022

(30) Foreign Application Priority Data
Jun. 18, 2019    (JP) .............................. JP2019-112425

(51) Int. Cl.
*H02M 7/48*    (2007.01)
*H02M 1/00*    (2006.01)
(52) U.S. Cl.
CPC ........... *H02M 1/0003* (2021.05); *H02M 7/48* (2013.01)
(58) Field of Classification Search
CPC ........... H02M 7/42; H02M 7/44; H02M 7/48; H02M 1/0003; H02M 1/0006
See application file for complete search history.

(56) References Cited

U.S. PATENT DOCUMENTS

| 4,723,201 A | * | 2/1988 | Tanamachi | H02P 27/08 318/811 |
| 4,902,910 A | * | 2/1990 | Hsieh | H03K 17/302 327/143 |
| 7,164,254 B2 | * | 1/2007 | Kerkman | H02M 1/44 318/803 |

FOREIGN PATENT DOCUMENTS

| JP | 2006-109688 A | 4/2006 |
| JP | 2015-2639 A | 1/2015 |

(Continued)

OTHER PUBLICATIONS

Chinese Office Action and English translation, Application No. 202080044471.6, dated Mar. 15, 2022, 12 pages.

(Continued)

*Primary Examiner* — Adolf D Berhane
(74) *Attorney, Agent, or Firm* — Foley & Lardner LLP (57) ABSTRACT

An inverter system includes a level skip prevention control section. The level skip prevention control section is configured to: in response to an upward shift of an output voltage level of a first one of phases, set a counter for inhibiting upward shifting of the output voltage level of the first phase during a predetermined duration, and set a counter for inhibiting downward shifting of an output voltage level of a second one of the phases other than the first phase during a predetermined duration; and in response to a downward shift of the output voltage level of the first phase, set a counter for inhibiting downward shifting of the output voltage level of the first phase during a predetermined duration, and set a counter for inhibiting upward shifting of the output voltage level of the second phase during a predetermined duration.

5 Claims, 9 Drawing Sheets

(56) References Cited

FOREIGN PATENT DOCUMENTS

| | | |
|---|---|---|
| JP | 2015-23777 A | 2/2015 |
| JP | 2015-220765 A | 12/2015 |
| JP | 2018-117423 A | 7/2018 |

OTHER PUBLICATIONS

Journal of Yantai University (Natural Science and Engineering), Study of a Method to Resolve the Problem of High dv/dt in Three-Level NPC Inverter, Jul. 2006, 6 pages.

* cited by examiner

INVERTER SYSTEM AND INVERTER SYSTEM CONTROL METHOD

TECHNICAL FIELD

The present invention relates to a system configured to output a voltage through an inverter, while performing a control for dangerous output prevention.

BACKGROUND ART

The following discusses a system configured to convert an inputted three-phase alternating current voltage into a direct current voltage by a rectifier (alternating current to direct current converter), and output through an inverter the direct current voltage as an alternating current voltage having a desired frequency and a desired amplitude.

Such a system is subject to a standard about output voltage. For example, an electric motor drive system in which an electric motor is connected to a load is subject to a standard of IEC 61800. IEC 61800-4 specifies a voltage stress tolerance about change rate of phase voltage (ground voltage) and line-to-line voltage. If a system does not meet this standard, the system may undergo a danger of dielectric breakdown.

For preventing such a danger in a system, it is required to suppress the rate of change of an output voltage of the system. Therefore, it is important to prevent sudden changes in voltage level of phase voltages and line-to-line voltages.

A patent document 1 discloses, as an example of countermeasure, a control for preventing a series multiplex inverter from causing a two-step shift (two level skip) of voltage level. Patent document 1 discloses preventing a line-to-line voltage from causing a two-step shift, by delaying switching timing as necessary with respect to a switching timing point obtained by PWM comparison.

For example, for a series multiplex high-voltage inverter, pulse modulation is implemented by PD (Phase Disposition) PWM or PS (Phase Shift) PWM, which have the following features about level skip.

PD system: No line-to-line level skip occurs, but single-phase inverters are uneven in number of switching operations.

PS system: Single-phase inverters can be set even in number of switching operations, but line-to-line level skipping occurs.

A CPS (Carrier Phase Selection) system is a PS system that has been improved so as not to cause level skipping. In both the PD system and the CPS system, it is a requirement for level skip prevention that a carrier is maintained higher in frequency than a command voltage. However, in some cases, a carrier is not allowed to have a high frequency, because of hardware factors such as an increase in switching loss and software factors such as a delay of CPU voltage updating. If the carrier frequency is lowered, line-to-line voltage level skipping cannot be completely avoided. There is also a method of providing an output filter for surge suppression, but this causes an increase in size of a device.

In addition, level skipping is also a problem in systems other than PWM systems based on triangular wave comparison. For example, a system based on fixed pulse pattern refers to a voltage phase command in a control system and outputs a voltage based on a table. The table can be prepared in advance which causes no level skipping. However, this is just based on a static study, and a problem is recognized in which level skipping may occur dynamically in a transient state (during actual operation). Therefore, in addition to consideration of level skipping when creating a table, a mechanism to prevent level skipping is required.

As described above, there are cases where a modulation system itself cannot prevent level skipping. In such a case, important is a level skip prevention mechanism after modulation.

In patent document 1, two-step shifting of a phase voltage is not considered. This is not a problem only regarding the standard about phase voltage (ground voltage). When one phase of a Y-connected load shifts by two steps and the other phase does not switch, the line-to-line voltage also shifts by two steps.

Therefore, even if each phase voltage is permitted to shift by two steps, it is required to monitor two-step shifting of each phase voltage in order to surely prevent the line-to-line voltage from shifting by two steps. Furthermore, patent document 1 is applicable only to series multiplex inverters configured to determine switching of each element by PWM.

In view of the foregoing, it is an issue to suppress level skipping of line-to-line voltages in an inverter system having an arbitrary number of phases and an arbitrary number of levels.

PRIOR ART DOCUMENT(S)

Patent Document(s)

Patent Document 1: Japanese Patent Application Publication No. 2015-23777

SUMMARY OF INVENTION

The present invention has been made in view of the conventional problems described above. According to one aspect of the present invention, an inverter system includes: a level skip prevention control section configured to output a gate signal based on a voltage level command, and drive an inverter by the gate signal; wherein the level skip prevention control section is configured to: in response to an upward shift of an output voltage level of a first one of phases, set a counter for inhibiting upward shifting of the output voltage level of the first phase during a predetermined duration, and set a counter for inhibiting downward shifting of an output voltage level of a second one of the phases other than the first phase during a predetermined duration; and in response to a downward shift of the output voltage level of the first phase, set a counter for inhibiting downward shifting of the output voltage level of the first phase during a predetermined duration, and set a counter for inhibiting upward shifting of the output voltage level of the second phase during a predetermined duration.

According to one aspect of the present invention, the inverter system is configured wherein the level skip prevention control section includes: a level skip check and prevention section configured to output each of the output voltage levels and each of the counters, based on the voltage level command, a previous output voltage level, and a previous counter; a first delay section configured to delay each of the counters by a control interval and output the delayed counter as the previous counter; a second delay section configured to delay each of the output voltage levels by the control interval and output the delayed output voltage level as the previous output voltage level; and a gate signal generation section configured to output the gate signal based on the output voltage levels.

According to one aspect of the present invention, the inverter system is configured wherein the level skip check and prevention section is configured to, for each of the phases: employ different counters including an upward shift inhibition counter and a downward shift inhibition counter respectively as the counter for inhibiting upward shifting and the counter for inhibiting downward shifting; decrement the upward shift inhibition counter and the downward shift inhibition counter at intervals of the control interval; compare the voltage level command with the previous output voltage level; when the voltage level command is lower than the previous output voltage level, check whether or not the downward shift inhibition counter is equal to zero, when the downward shift inhibition counter is equal to zero, set the output voltage level of the each phase by a single downward step from the previous output voltage level, set the downward shift inhibition counter of the each phase, and set the upward shift inhibition counter of each of the phases other than the each phase, and when the downward shift inhibition counter is not equal to zero, set the output voltage level of the each phase to be equal to the previous output voltage level; when the voltage level command is equal to the previous output voltage level, set the output voltage level of the each phase to be equal to the voltage level command; and when the voltage level command is higher than the previous output voltage level, check whether or not the upward shift inhibition counter is equal to zero, when the upward shift inhibition counter is equal to zero, set the output voltage level of the each phase by a single upward step from the previous output voltage level, set the upward shift inhibition counter of the each phase, and set the downward shift inhibition counter of each of the phases other than the each phase, and when the upward shift inhibition counter is not equal to zero, set the output voltage level of the each phase to be equal to the previous output voltage level.

According to another aspect of the present invention, the inverter system is configured wherein the level skip check and prevention section is configured to, for each of the phases: employ a common counter as the counter for inhibiting upward shifting and the counter for inhibiting downward shifting; decrement the common counter at intervals of the control interval, when the common counter is greater than zero; increment the common counter at intervals of the control interval, when the common counter is less than zero; compare the voltage level command with the previous output voltage level; when the voltage level command is lower than the previous output voltage level, check whether or not the common counter is greater than or equal to zero, when the common counter is greater than or equal to zero, set the output voltage level of the each phase by a single downward step from the previous output voltage level, set the common counter of the each phase to a negative value, and set the common counter of each of the phases other than the each phase to a positive value, and when the common counter is less than zero, set the output voltage level of the each phase to be equal to the previous output voltage level; when the voltage level command is equal to the previous output voltage level, set the output voltage level of the each phase to be equal to the voltage level command; and when the voltage level command is higher than the previous output voltage level, check whether or not the common counter is less than or equal to zero, when the common counter is less than or equal to zero, set the output voltage level of the each phase by a single upward step from the previous output voltage level, set the common counter of the each phase to a positive value, and set the common counter of each of the phases other than the each phase to a negative value, and when the common counter is greater than zero, set the output voltage level of the each phase to be equal to the previous output voltage level.

According to the present invention, it is possible to suppress level skipping of line-to-line voltages in an inverter system having an arbitrary number of phases and an arbitrary number of levels.

MODE(S) FOR CARRYING OUT INVENTION

The following details inverter systems according to first and second embodiments of the present invention with reference to FIGS. 1 to 10.

[First Embodiment] In the following, an n-step shift of a voltage level is referred to as n-level skip or simply as level skip.

Figure 1:
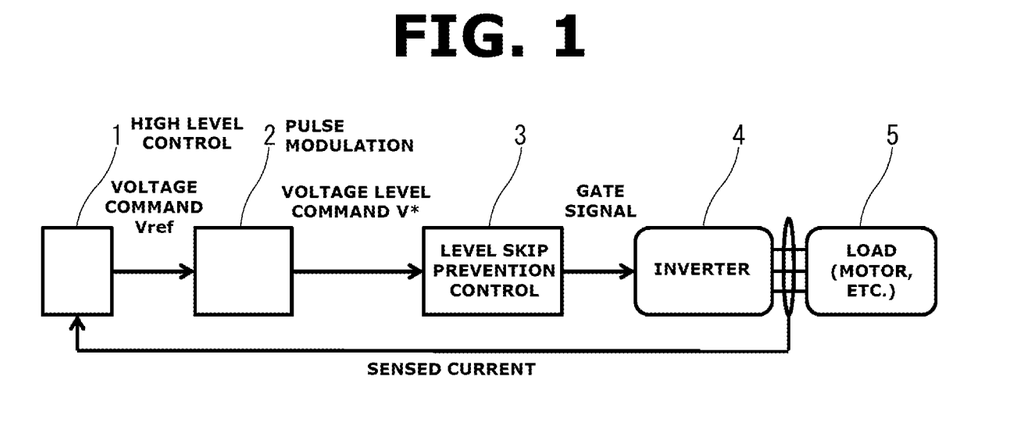
FIG. 1 is a block diagram of an inverter system according to first and second embodiments.

FIG. 1 shows a system configuration diagram of the inverter system according to the first embodiment. A high level control section 1 performs a control upstream of a pulse modulation section 2. For example, the high level control section 1 receives input of a speed command based on an amount of operation of an operation panel, and input of sensed three-phase currents, and performs a control to generate a voltage command Vref through a speed control and an electric current control.

The voltage command Vref outputted from the high level control section 1 is converted by the pulse modulation section 2 into a pulse form (rectangular wave form) of voltage. This is typically a PWM system configured to generate a pulse voltage by comparing a three-phase voltage command with a triangular wave. There is an alternative system based on fixed pulse pattern, which is configured to prepare a table of pulses synchronized with the voltage command Vref (output voltage phase), and output a pulse voltage with reference to the voltage command Vref (output voltage phase) of the high level control section 1. The pulse modulation section 2 outputs a voltage level command V*.

A level skip prevention control section 3 receives input of the voltage level command V*, and performs a control for level skip prevention, and outputs a gate signal. An inverter 4 is driven by the gate signal, and applies a voltage to a load 5.

The voltage command Vref and the voltage level command V* each have information about a required number of phases (three phases in FIG. 1).

The high level control section 1 according to the first embodiment serves to determine the voltage command Vref that indicates a voltage to be outputted by the inverter 4. Accordingly, the high level control section 1 may be configured to perform a position control, or may be configured to use a sensed value of a motor phase, or may be configured to use no sensed current.

When pulse modulation is performed by the PWM system, a gate signal may be directly obtained by a result of comparison between the voltage command Vref and the triangular wave. However, determining ON/OFF of each element is equivalent to obtaining the voltage level command V*. By configuration that the voltage level command V* is obtained instead of the gate signal or by configuration that the obtained gate signal is not outputted but converted into the voltage level command V*, the pulse modulation section 2 based on the PWM system can output the voltage level command V*.

The high level control section 1 and the pulse modulation section 2 in FIG. 1 are shown as a typical configuration used in many inverter systems, but are not particularly limited if the voltage level command V* indicating a voltage to be outputted by the inverter 4 is inputted to the level skip prevention control section 3. The first embodiment can be applied also to systems based on direct torque control in which a voltage level for obtaining a desired torque is directly determined from a torque command without pulse modulation such as PWM based on triangular wave comparison.

In FIG. 1, the inverter 4 and the load 5 are connected in three phases. However, the number of phases is not limited to three. Furthermore, the number of voltage levels that can be outputted by the inverter 4 is not particularly limited.

Next, the following describes the level skip prevention control section 3. Since the level skip prevention control section 3 controls the output voltage level V, the level skip prevention control section 3 requires information on the current output. In addition, the level skip prevention control section 3 requires a counter C, because it is required to indicate a time period for holding in order to prevent level skipping. It is an important aspect of the control according to the first embodiment that the current output voltage level is appropriately changed by using the counter C.

Information regarding a previous output voltage level Vz is required to implement "hold of output voltage" which is considered to be a desirable output in most cases when level skipping is inhibited. When one switching operation occurs, not all types of subsequent switching cause level skipping, and some types of subsequent switching are acceptable. A process for appropriately permitting acceptable switching operations is described below with reference to a flowchart of FIG. 3.

Figure 2:
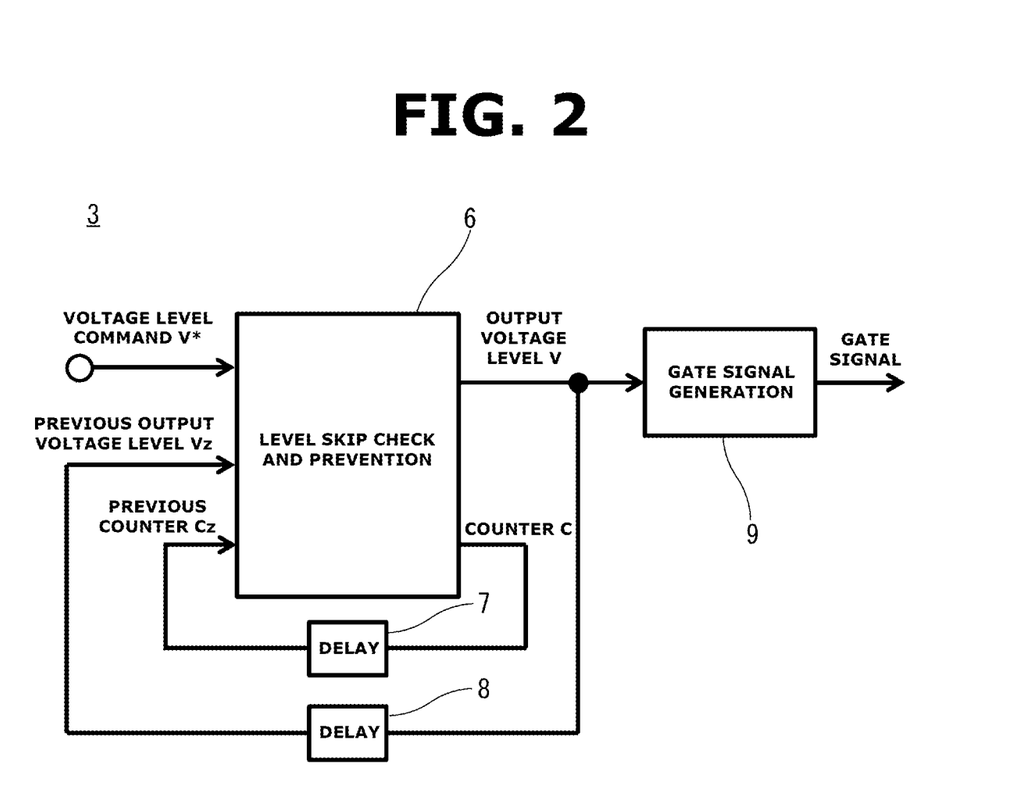
FIG. 2 is a block diagram of a level skip prevention control section according to the first and second embodiments.

FIG. 2 shows a configuration diagram of the level skip prevention control section 3 according to the first embodiment. The voltage level command V* is inputted to the level skip prevention control section 3. Then, the voltage level command V*, the previous output voltage level Vz, and the previous counter Cz are inputted to the level skip check and prevention section 6.

The level skip check and prevention section 6 performs a control based on the flowchart described below, and outputs the output voltage level V and the counter C. The output voltage level V and the counter C are delayed by a control interval by first and second delay units 7 and 8, and inputted to the level skip check and prevention section 6 as the previous output voltage level Vz and the previous counter Cz.

The output voltage level V is inputted to a gate signal generation section 9, and the gate signal generation section 9 outputs a gate signal for outputting the output voltage level V. The gate signal is the output of the level skip prevention control section 3 to the inverter 4.

Figure 3:
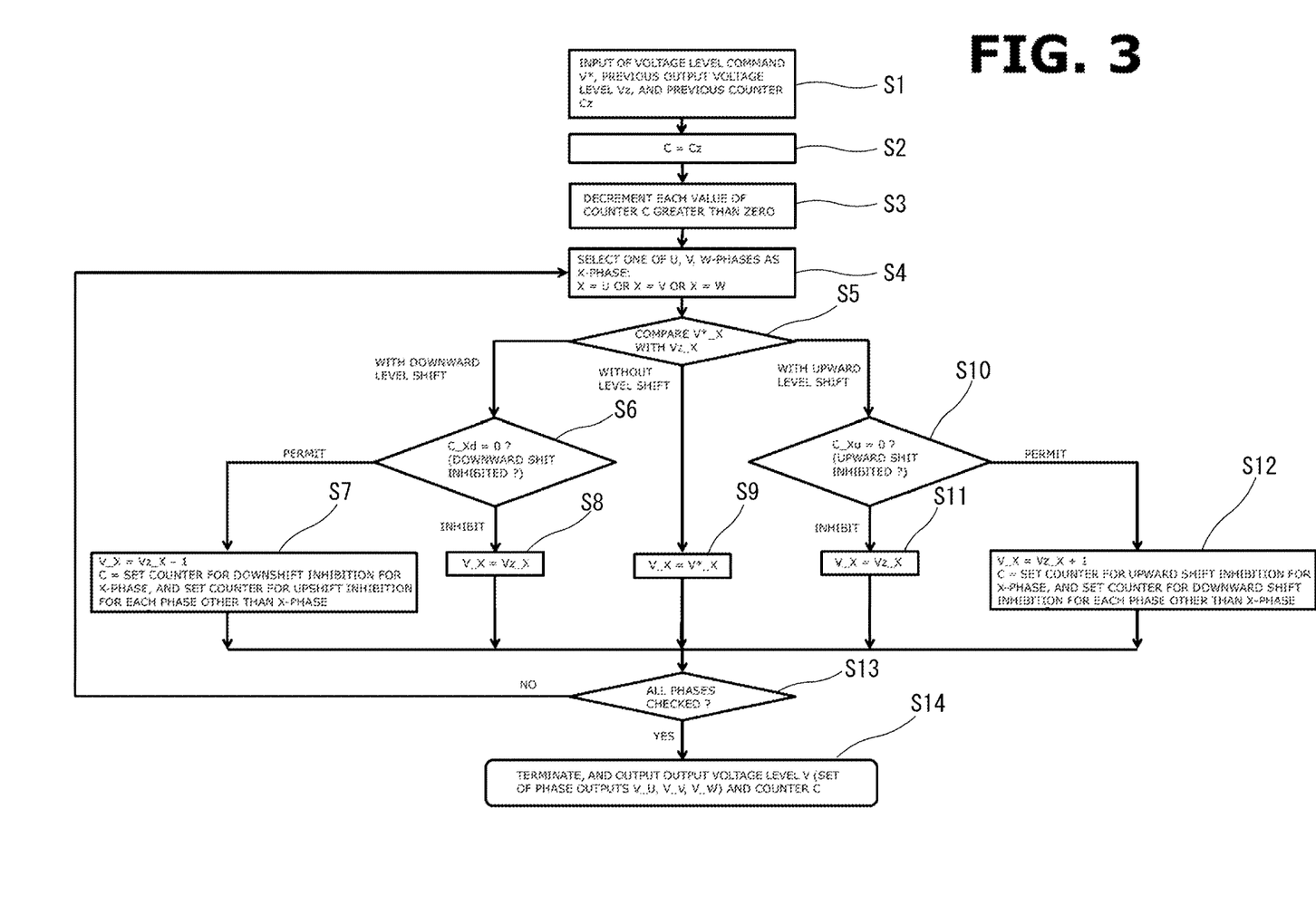
FIG. 3 is a flowchart of a level skip check and prevention section according to the first embodiment.

FIG. 3 is a flowchart showing a process performed by the level skip check and prevention section 6. The level skip check and prevention section 6 receives input of the voltage level command V*, the previous output voltage level Vz, and the previous counter Cz, and outputs the output voltage level V and the counter C.

The flowchart of FIG. 3 relates to three-phase voltages of U, V, and W phases in correspondence to FIG. 1. However, as discussed above, the applicable number of phases is not limited to three.

In the following, the output voltage level of an X-phase is expressed in the form of V_X, and the counter of the X-phase is expressed in the form of C_X. The voltage level command V* is also expressed as V*_X, the last letter indicating the related phase. The line-to-line voltage between the X-phase and the Y-phase is represented by V_XY. Furthermore, the first embodiment employs two independent registers for two types of counters, one for inhibiting upward shifting and the other for inhibiting downward shifting. This is indicated as u, d (upward shifting, downward shifting, respectively) after indication of the phase, such as C_Xu, C_Xd.

The following discusses operation according to the flowchart of FIG. 3 as an example of driving of the inverter 4 having the U-phase, the V-phase, and the W-phase. The flowchart is based on the following concepts.

<1> When there is no level shift, it is outputted as commanded (if the values are equal to each other, the previous output may be outputted).

<2> When the level shifts, level skipping is checked.

<2-1> When level skipping occurs, the previous output is held.

<2-2> When no level skipping occurs, the level is shifted by one step and the counters are set.

<2-2-1> When setting the counters, change of the own phase in the same direction and change of the other phases in the opposite direction are inhibited.

Based on the above concept, level skipping of each phase voltage and line-to-line voltage is suppressed. Next, the following describes the process of the level skip check and prevention section 6 with reference to the flowchart of FIG. 3.

At S1, the level skip check and prevention section 6 receives input of the voltage level command V*, the previous output voltage level Vz, and the previous counter Cz. At S2, the level skip check and prevention section 6 sets the current counter C as the current counter C=the previous counter Cz.

At S3, the level skip check and prevention section 6 decrements each value of the counter C larger than zero. At S4, the level skip check and prevention section 6 selects one of the U-phase, the V-phase, and the W-phase, wherein the selected phase is designated as X-phase (X=U or X=V or X=W).

At S5, the level skip check and prevention section 6 compares the X-phase voltage level command V*_X with the X-phase previous output voltage level Vz_X. When a level shift occurs and is in a downward direction (namely, V*_X<Vz_X), the process proceeds to S6. When no level shift occurs (namely, V*_X=Vz_X), the process proceeds to S9. When a level shift occurs and is in an upward direction (namely, V*_X>Vz_X), the process proceeds to S10.

At S6, the level skip check and prevention section 6 determines whether or not the X-phase downward shift inhibition counter C_Xd is equal to zero. When the X-phase downward shift inhibition counter C_Xd is equal to zero, the process proceeds to S7. When the X-phase downward shift inhibition counter C_Xd is not equal to zero, the process proceeds to S8. At S7, the level skip check and prevention section 6 sets the X-phase output voltage level V_X to a value that is one step lower than the X-phase previous output voltage level Vz_X (V_X=Vz_X−1). Furthermore, the counter C of the X-phase is set for downward shift inhibition, and the counter C other than the X-phase is set for upward shift inhibition. At S8, since the counter C_Xd for inhibiting downward shifting of the X-phase is set, the level skip check and prevention section 6 sets the X-phase output voltage level V_X equal to the X-phase previous output voltage level Vz_X (V_X=Vz_X).

At S9, since the X-phase voltage level command V*_X is equal to the X-phase previous output voltage level Vz_X, the level skip check and prevention section 6 sets the X-phase output voltage level V_X equal to the X-phase voltage level command V*_X (V_X=V*_X).

At S10, the level skip check and prevention section 6 determines whether or not the X-phase upward shift inhibition counter C_Xu is equal to zero. When the X-phase upward shift inhibition counter C_Xu is not equal to zero, the process proceeds to S11. When the X-phase upward shift inhibition counter C_Xu is equal to zero, the process proceeds to S12. At S11, since the X-phase upward shift inhibition counter C_Xu is set, the level skip check and prevention section 6 sets the X-phase output voltage level V_X equal to the X-phase previous output voltage level Vz_X (V_X=Vz_X). At S12, the level skip check and prevention section 6 sets the X-phase output voltage level V_X to a value that is one step higher than the X-phase previous output voltage level Vz_X (Vz_X+1). Furthermore, the counter C of the X-phase is set for upward shift inhibition, and the counter C other than the X-phase is set for downward shift inhibition.

At S13, the level skip check and prevention section 6 determines whether or not the determination and processing has been performed for all the phases. When the determination and processing has been performed for all the phases, the process proceeds to S14. When the determination and processing has not yet performed for all the phases, the process returns to S4. At S14, the level skip check and prevention section 6 outputs the output voltage level V (as a set of phase outputs V_U, V_V, V_W) and the counter C, and terminates the processing in the current control cycle.

In this way, the level skip check and prevention section 6 is configured to: for an upward shift of an output voltage level of a first one of phases, set a counter for inhibiting the upward shift of the output voltage level of the first phase during a predetermined duration, and set a counter for inhibiting a downward shift of an output voltage level of a second one of the phases other than the first phase during a predetermined duration; and for a downward shift of the output voltage level of the first phase, set a counter for inhibiting the downward shift of the output voltage level of the first phase during a predetermined duration, and set a counter for inhibiting an upward shift of the output voltage level of the second phase during a predetermined duration.

"waitcycle" represents an assigned value for setting the counter. The value of waitcycle is set to an integer to satisfy the following mathematical expression (1) using the control cycle Tc of the level skip prevention control and a minimum time margin (shortest buffer time period for preventing treatment as level skip) tb required after one step shift.

$$\text{waitcycle} \times Tc > tb \tag{1}$$

The minimum time margin tb is designed such that the voltage change rate is suppressed below a standard of each application target. As a rough guide, the minimum time margin tb is set to a value several μs larger than a setting value of the switching buffer (dead time) to prevent a short circuit.

Depending on whether or not the counter C is equal to zero, it is determined whether or not the corresponding switching is permitted. When the counter C is equal to zero, the corresponding switching is permitted. When the counter C is not equal to zero, the corresponding switching is inhibited. Each phase requires two types of counters, one for inhibiting upward shifting and the other for inhibiting downward shifting. Accordingly, in case of three phases, a total of six counters are employed.

When simultaneous switching operations in multiple phases which cause level skipping, the level skipping can be prevented by updating the counter C in the loop, wherein it is held at the previous output voltage level that is the phase handled later in the loop part of FIG. 3.

This may be modified such that the command information of each phase is recorded and the order of operation of the loop may be changed at S4 so that older switching operation is prioritized. Alternative to prioritizing older switching operation, it is conceivable to change the order of loop examination based on the output phase information in order to easily maintain the equilibrium of the three phases. For example, based on the phase of U-phase θu, loop calculation is performed in order of U→V→W in case of 0°<θu≤120°, V→W→U in case of 120°<θu≤240°, W→U→V in case of 240°<θu≤360°.

Figure 4:
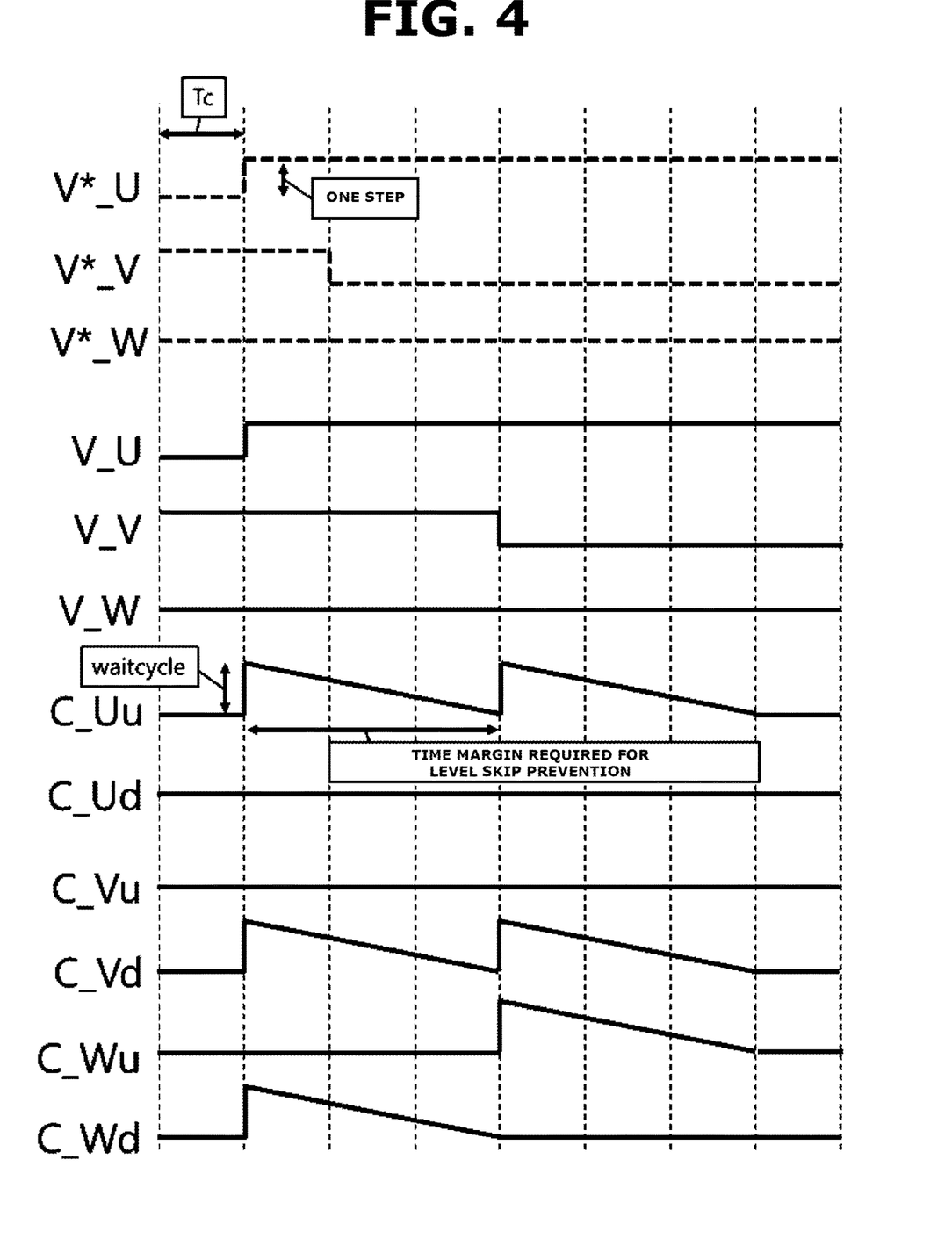
FIG. 4 is a diagram showing an example of operation of the first embodiment based on three-phase configuration.

In the following, the operation according to the flowchart is checked in case of a basic waveform. FIG. 4 shows a conceptual diagram showing an example of operation of the flowchart for a case of three phases. The following describes the operation also with reference to FIG. 5.

Figure 5:
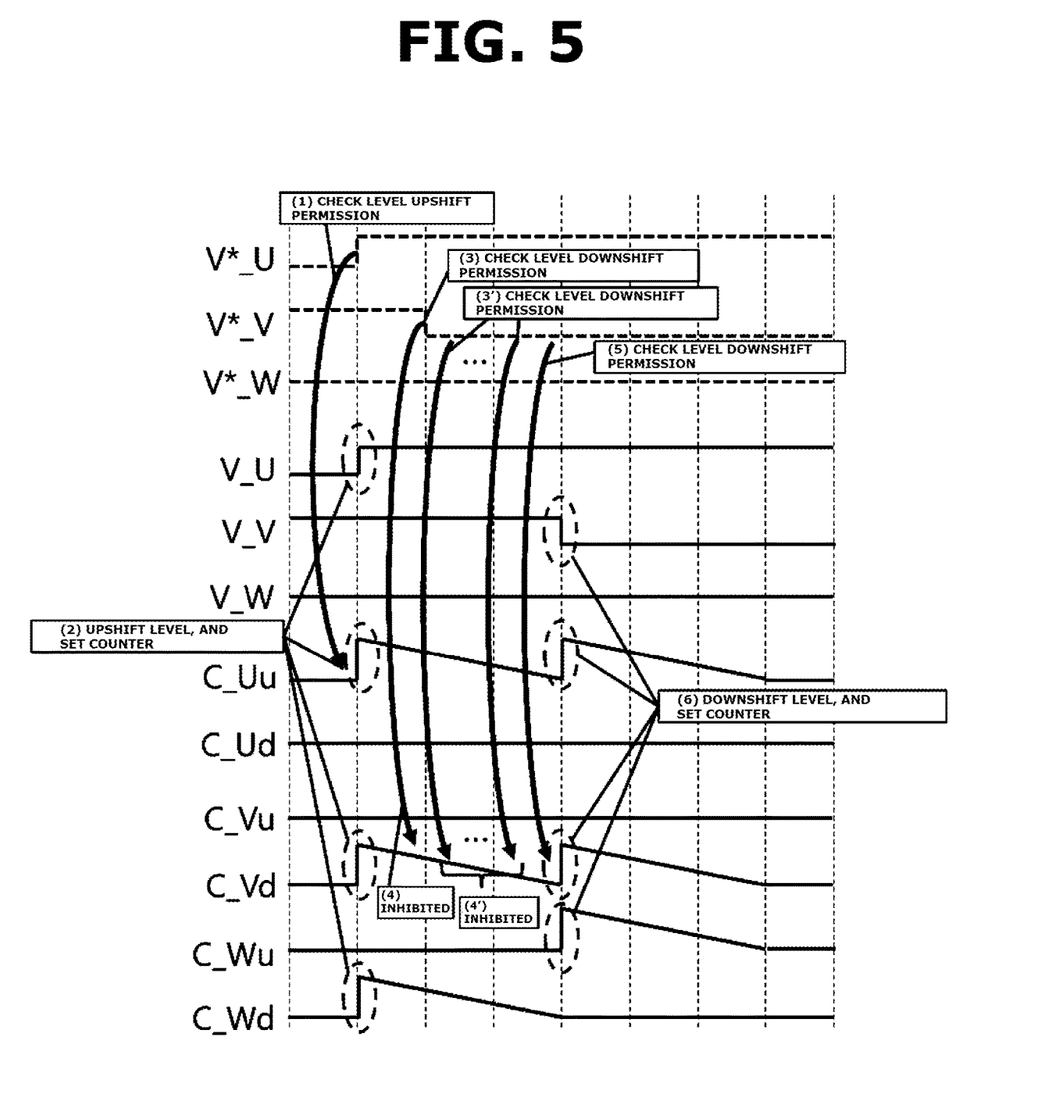
FIG. 5 is a diagram explaining the operation of FIG. 4.

FIGS. 4 and 5 show values of the voltage level command V*, the output voltage level V, and the counter C. First, no switching is performed for a long time, and the counters C_Uu, C_Ud, C_Vu, C_Vd, C_Wu, and C_Wd are each equal to zero at start (all kinds of switching are permitted). Therefore, when the U-phase voltage level command V*_U is gets higher, the corresponding switching is permitted.

Then, the counter C_Uu for inhibiting upward shifting is set for the U-phase which is the own phase, and the counters C_Vd and C_Wd for inhibiting downward shifting are set for the other phases, V-phase and W-phase.

Thereafter, the V-phase voltage level command V*_V is gets lower, but the corresponding switching is not permitted because the counter C_Vd inhibits downward shifting of the V-phase, and only when the counter C_Vd gets equal to zero, the V-phase output voltage level V_V is switched in the downward direction.

At this time, the V-phase downward shift inhibition counters C_Vd is set, and the U-phase and W-phase upward shift inhibition counters C_Uu and C_Wu are set. This means that level skipping of the line-to-line voltage level V_UV due to a U-phase upward shift and a V-phase downward shift can be suppressed.

From the above, it is confirmed that level skipping of line-to-line voltages is suppressed by determining the voltage levels based on the flowchart of FIG. 3.

Figure 6:
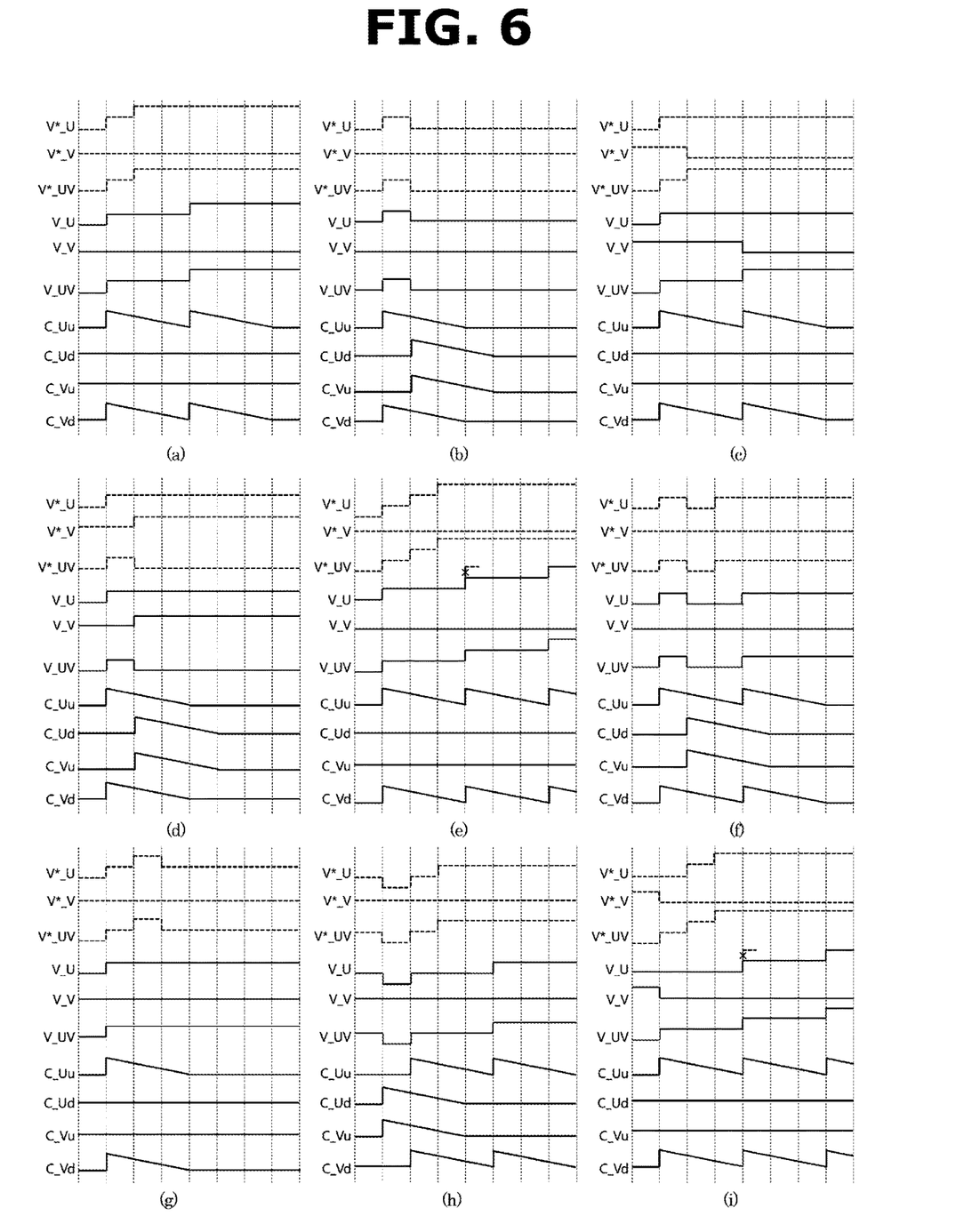
FIG. 6 is a diagram showing examples of operation of the first embodiment when switching operations are dense.
Figure 7:
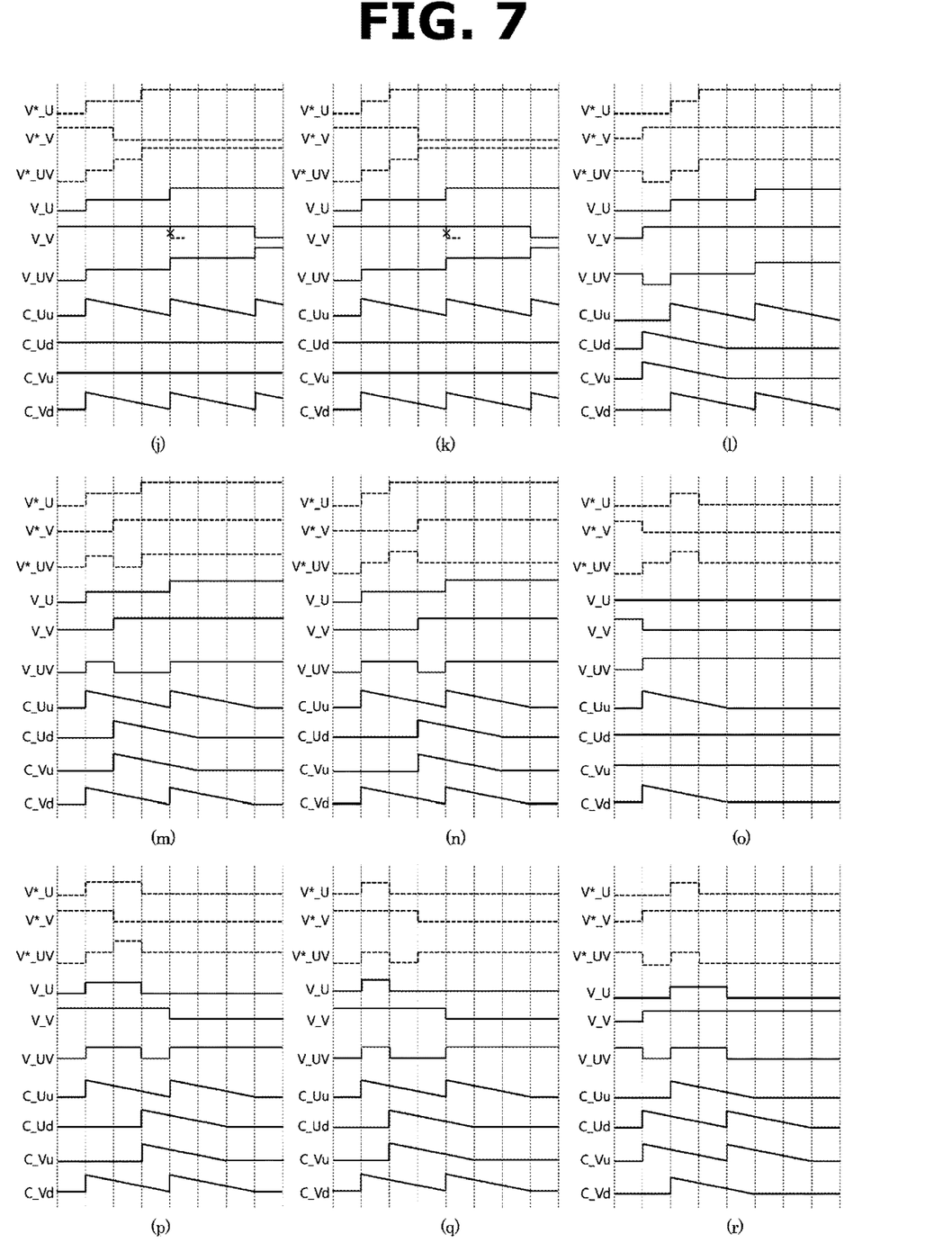
FIG. 7 is a diagram showing examples of operation of the first embodiment when switching operations are dense.
Figure 8:
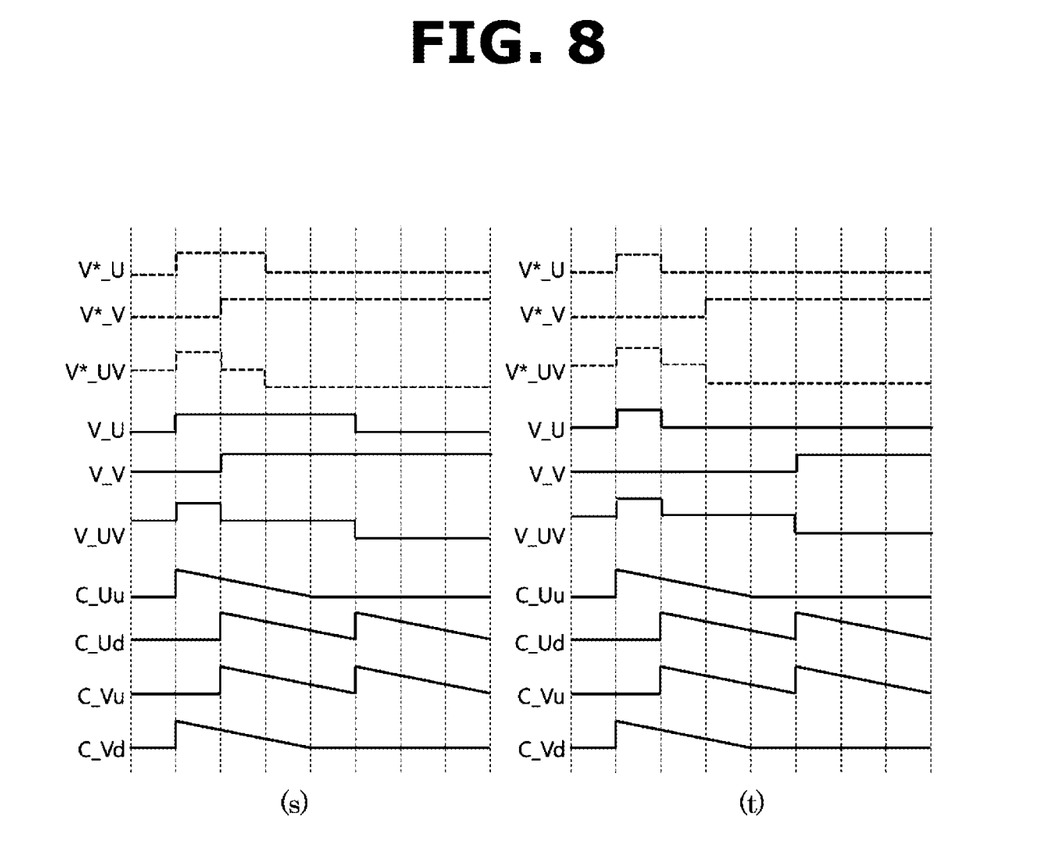
FIG. 8 is a diagram showing examples of operation of the first embodiment when switching operations are dense.

Next, the following discusses situations where switching operations are dense, with reference to FIGS. 6, 7, and 8. The following describes behavior of two phases, the U-phase and V-phase. Description of equivalent combinations is omitted in consideration of symmetry between upward shifting and downward shifting and symmetry between two phases.

In FIGS. 6, 7, and 8, instead of the W-phase voltages, the line-to-line voltage level command V*_UV and the line-to-line voltage level V_UV between the U-phase and V-phase are shown. For ease of understanding, these are calculated from the output voltage levels of the U-phase and the V-phase. However, the line-to-line voltage level command V*_UV and the line-to-line voltage level V_UV between the U-phase and V-phase are not actually inputted and outputted directly.

It is to be noted that in FIGS. 6, 7 and 8, the order of consideration of the phases, namely, the priority at the time of simultaneous switching operations in opposite directions is set as U→V (actually, any priority can be set).

As can be seen from FIGS. 6, 7, and 8, level skipping of the phase voltages and level skipping of the line-to-line voltages can be suppressed when two to three switching operations are densely performed. In order to emphasize the function of the flowchart, some waveforms include an incorrect operation pattern that is indicated by a dotted line and marked with a cross. If the flowchart functions normally, the output appears as a solid line with no dotted waveform.

The following discusses a situation where four or more switching operations are densely performed. As can be seen from FIGS. 6, 7 and 8, after one switching operation (in the two-phase configuration of U-phase and V-phase), only the switching of the own phase in the opposite direction or the switching of the other phase in the same direction is permitted during the inhibition period.

When the second switching operation is performed, all switching operations are inhibited for the inhibition period due to the first switching operation, and any subsequent switching operations are delayed to the end time of the inhibition period or disappear during the inhibition period.

As a result of the level skip prevention, a new problem of level skipping may occur as the delayed switching operation approaches the later one. Also in such a situation, assuming that the switching has moved to the end point of the inhibition period, it can be explained by the waveforms of FIGS. 6, 7, and 8.

In this way, even when four or more switching operations are dense, it is only an extension of the study of FIGS. 6, 7, and 8, and level skipping of the phase voltages and level skipping of the line-to-line voltages is surely prevented.

Next, the following discusses a case of an inverter having multiple levels. The fact that the inverter having multiple levels may affect when multi-level skipping occurs during the inhibition period. However, since even in that situation only one-step shift is permitted in the flowchart of FIG. 3, level skipping can be prevented even in such a multi-level inverter.

Next, the following discusses a case of three or more phases. Since the counter setting of the level skip prevention control is based on whether the target is the own phase or another phase, it can be understood that line-to-line level skips among all phases are constantly managed even when the number of phases is three. For simultaneous switching operations of multiple phases, level skipping is prevented by the counter updating during the loop, as shown in the flowchart of FIG. 3.

The level skip prevention control can be applied to any number of phases of 4 or more. The flowchart of FIG. 3 can be applied as it is in cases where each phase has a line-to-line voltage with each other phase (star connection type wiring). For example, if four phases are connected in a square shape, there is no line-to-line voltage between diagonal phases. Accordingly, it is to be noted that counters are provided only for phases requiring the same.

Next, the following discusses the gate signal generation section 9. The gate signal generation section 9 generates a gate signal for outputting the output voltage level V. This is determined in accordance with the circuit configuration of the inverter 4 to which the system is be applied.

Generally, it is required to disperse a load among elements. This point may be determined with reference to the switching order in PWM and the like. If it is complicated, a system may be employed which prepares a table. However, in a series multiple inverter in which multiple single-phase inverters are connected in series in each of the U, V, and W-phases, a very small pulse may occur due to a dead time, depending on each phase voltage and allocation to each single-phase inverter. This very small pulse cannot be managed by the level skip check and prevention section 6, and may cause level skipping, which should be carefully prevented from occur.

As described above, by the control to provide an inhibition period for a specific switching operation according to the first embodiment, level skipping of phase voltages (ground voltages) and level skipping of line-to-line voltages can be suppressed in in an inverter system having an arbitrary number of phases and an arbitrary number of levels.

As compared with patent document 1, the first embodiment has an advantage that the phase voltages are considered and the application target is not limited to series multiplex inverters.

[Second Embodiment] In the first embodiment, the control is studied which prevents level skipping of phase voltages and level skipping of line-to-line voltages. However, the phase voltages can be easily suppressed by another method such as a method of limiting the voltage change rate when the high level control section 1 generates the voltage command Vref. Also, in some situations, the standard value of the voltage change rate differs between the phase voltage (voltage to ground) and the line-to-line voltage, and two-level skipping of the phase voltage is permitted. Therefore, in the second embodiment, a control is studied which prevents only level skipping of the line-to-line voltages without considering the phase voltages.

The second embodiment is the same as the first embodiment except for the flowchart. Namely, the system configuration is the same as in FIGS. 1 and 2.

Figure 9:
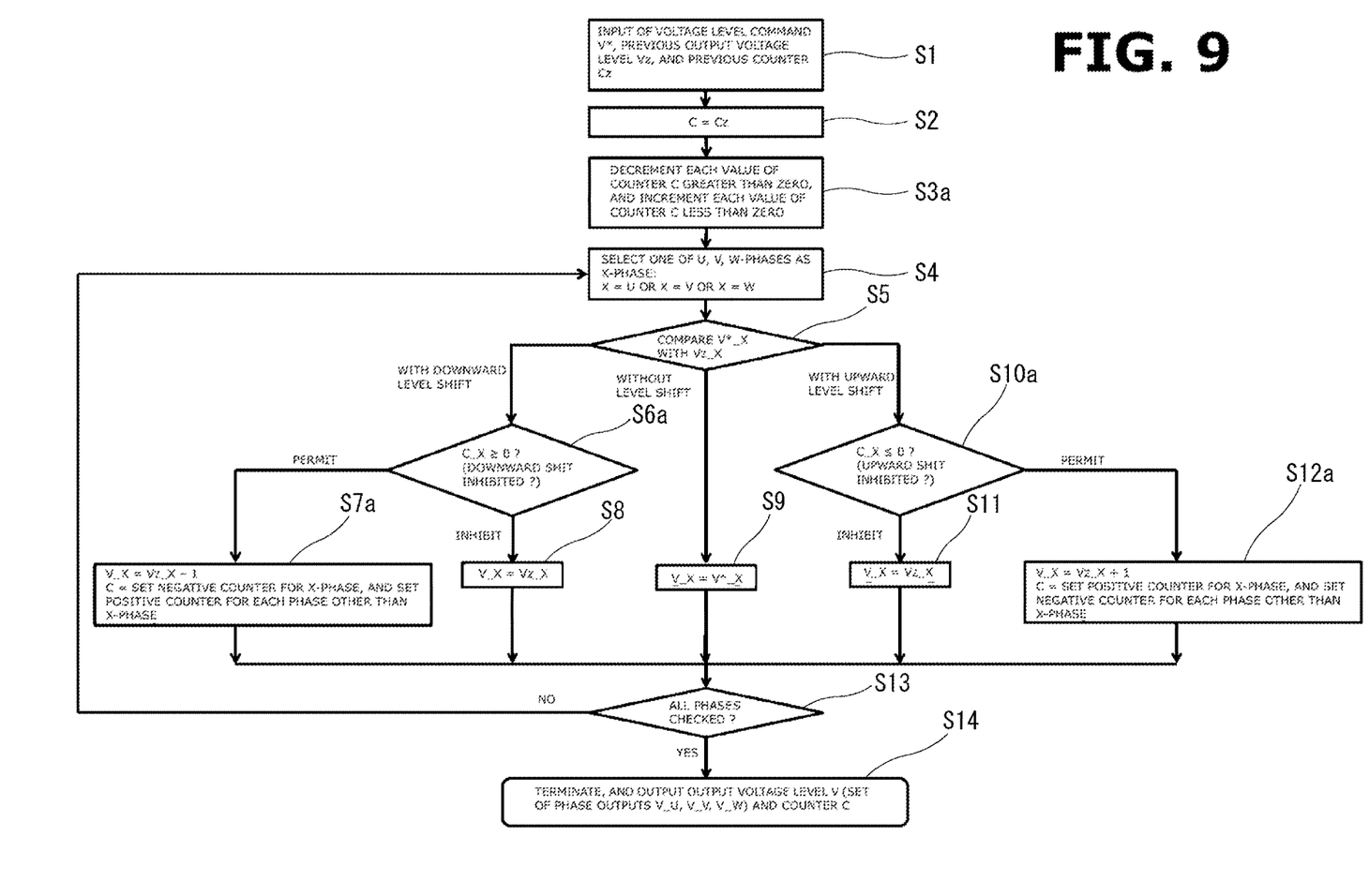
FIG. 9 is a flowchart of a level skip check and prevention section according to the second embodiment.

FIG. 9 shows a flowchart of the level skip check and prevention section 6 according to the second embodiment. Description of configuration is equivalent to that for FIG. 3, wherein parts related to a counter (S3a, S6a, S7a, S10a, S12a) are modified from those of FIG. 3.

The following describes a concept of the flowchart of the second embodiment. An item <2-2-2> is added with respect to the first embodiment.

<1> When there is no level shift, it is outputted as commanded (if the values are equal to each other, the previous output may be outputted).

<2> When the level shifts, level skipping is checked.

<2-1> When level skipping occurs, the previous output is held.

<2-2> When no level skipping occurs, the level is shifted by one step and the counters are set.

<2-2-1> When setting the counters, change of the own phase in the same direction and change of the other phases in the opposite direction are inhibited.

<2-2-2> The counters are updated sequentially every time switching is performed.

Based on the above concept, level skipping of the line-to-line voltages is prevented. The following describes a process performed by the level skip check and prevention section 6 according to the second embodiment with reference to the flowchart of FIG. 9, wherein only parts different from those in FIG. 3 are described, and description of the same parts is omitted. In the second embodiment, the counter is common for upward shift inhibition and downward shift inhibition.

At S3a, the level skip check and prevention section 6 decrements each value of the counter C larger than zero, and increments each value of the counter C smaller than zero.

At S6a, the level skip check and prevention section 6 determines whether or not the X-phase counter $C\_X$ is greater than or equal to zero ($C\_X \geq 0$). When the X-phase counter $C\_X$ is greater than or equal to zero, the process is proceeds to S7a. When the X-phase counter $C\_X$ is smaller than zero, the process proceeds to S8. At S7a, the level skip check and prevention section 6 sets the X-phase output voltage level $V\_X$ to a value that is one step lower than the X-phase previous output voltage level $Vz\_X$ ($Vz\_X-1$). Furthermore, the X-phase counter C is set as a negative value, and the counter C of each phase other than the X-phase is set as a positive value.

At S10a, the level skip check and prevention section 6 determines whether or not the X-phase counter $C\_X$ is less than or equal to zero ($C\_X \leq 0$). When the X-phase counter $C\_X$ is greater than zero, the process proceeds to S11. When the X-phase counter $C\_X$ is less than or equal to zero, the process proceeds to S12a. At S12a, the level skip check and prevention section 6 sets the X-phase output voltage level $V\_X$ to a value that is one step higher than the X-phase previous output voltage level $Vz\_X$ ($Vz\_X+1$). Furthermore, the X-phase counter C is set as a positive value, and the counter C of each phase other than the X-phase is set as a negative value.

The following describes modifications in the counter. When upward shifting is inhibited, waitcycle is substituted for the counter C, and when downward shifting is inhibited, "−waitcycle" is substituted for the counter C. The counting is performed by decrementing or incrementing in the direction approaching zero.

For example, when the counter $C\_X$ is equal to zero, both upward shifting and downward shifting are permitted in the X-phase. When the counter $C\_X$ is larger than zero, upward shifting is inhibited in the X-phase. When the counter $C\_X$ is less than zero, downward shifting is inhibited in the X-phase.

Furthermore, by reducing the number of registers to half (one for each phase) and updating the counter every time switching is performed, unnecessary switching inhibition periods can be reduced from the first embodiment.

Regarding the counter setting, it is described above that only the line-to-line voltages are considered. However, in the flowchart of FIG. 9, the counter for inhibiting switching in the same direction is set in the own phase. This is to prevent level skipping of line-to-line voltages due to level skipping of phase voltages. However, as discussed below, it is to be noted that level skipping of the phase voltages may occur although level skipping of the line-to-line voltages can be prevented.

Figure 10:
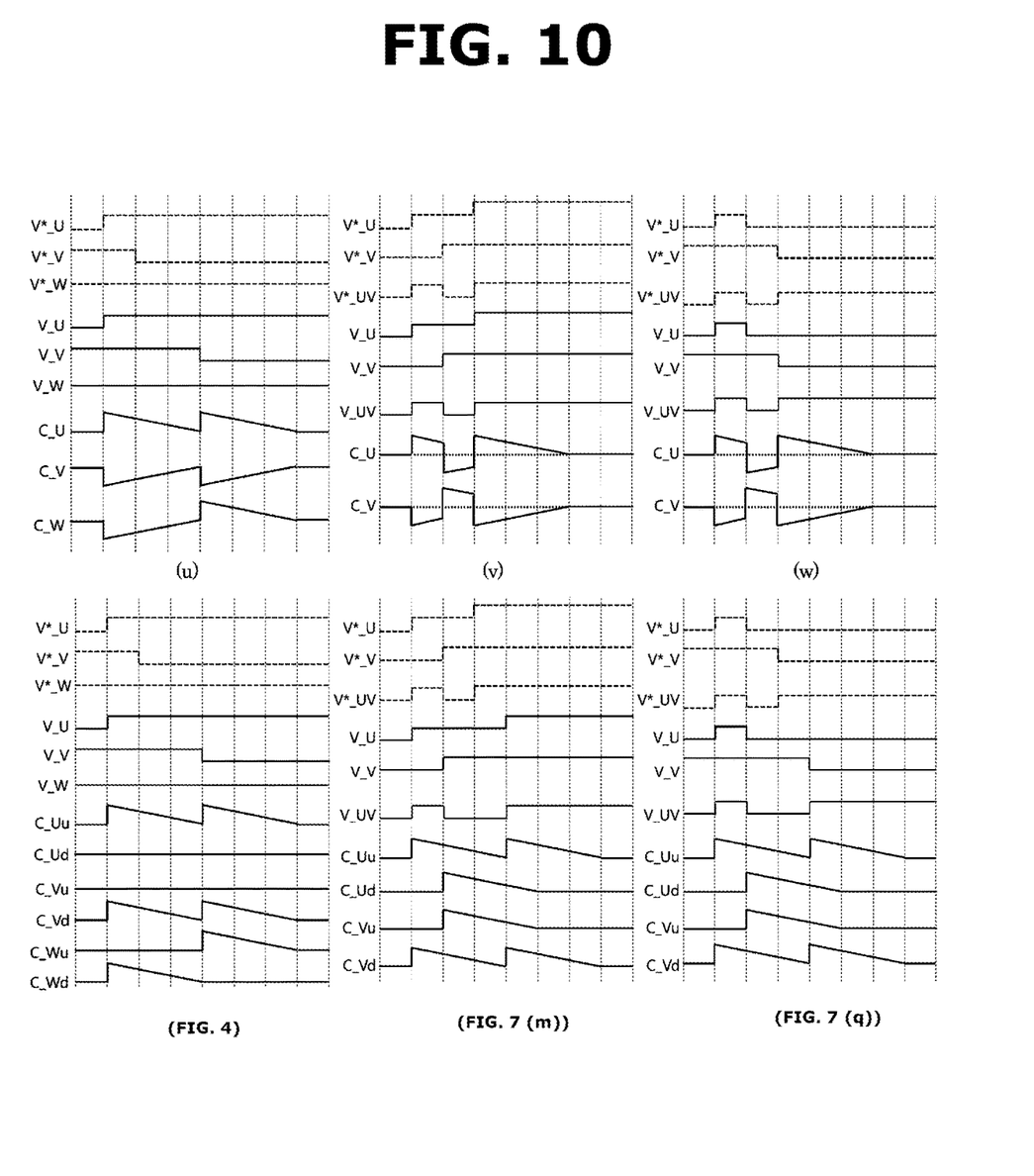
FIG. 10 is a diagram showing examples of operation of the second embodiment.

The following describes an example of characteristic operation. FIG. 10 shows an operation according to the flowchart of FIG. 9. FIG. 10 (u) corresponds to FIG. 4 for the first embodiment, FIG. 10 (v) corresponds to FIG. 7 (m) for the first embodiment, and FIG. 10 (w) corresponds to FIG. 7 (q) for the first embodiment.

FIG. 10 (u) shows basic level skip suppression, in which the V-phase downward shifting is inhibited by an initial U-phase upward shift, and the V-phase downward shifting is carried out at the end of the inhibition period. The output voltage level V is the same as that of the first embodiment, but it can be seen that the number of counters is reduced and each counter is raised and lowered to inhibit upward shifting and downward shifting.

FIG. 10 (v) shows a situation in the second embodiment where a phase voltage level skips, although the first embodiment shows a waveform with no phase voltage level skip. In the second embodiment, since the counter is updated sequentially, level skipping of the phase voltages may be unable to be prevented even when level skipping of the line-to-line voltages can be prevented.

In contrast to a case in the first embodiment where an unnecessary inhibition period is provided, FIG. 10 (w) shows a case in the second embodiment where no unnecessary inhibition period occurs. This is also due to the sequential updating of the counter. In the second embodiment, when the line-to-line voltage level does not skip, there is no influence of a very small pulse.

As discussed above, the second embodiment is capable of preventing level skipping of the line-to-line voltages, and solving a problem of a voltage error due to unnecessary inhibition periods as in the first embodiment.

The second embodiment can be applied to an inverter system having multiple levels similar to the first embodiment, because of the feature that the level is shifted step by step.

The following discusses a case of three or more phases. At first glance, there is a concern that some line-to-line voltages cannot be managed due to the counters updated sequentially. Hence, a case is considered where a first phase is switched and a second phase is switched in a direction in which the second phase is permitted during an inhibition time period caused by the switching of the first phase.

During the inhibition period caused by the switching of the first phase, the switching of the second phase in the opposite direction is constantly permitted, so that the counter of the phase other than the two phases that have just been switched is maintained positive or negative (the direction of inhibition does not change). Namely, during the inhibition period by one switching operation, the direction of inhibition is not changed by overwriting. Therefore, no level skip occurs in the line-to-line voltage on which attention is focused before overwriting, so that the second embodiment can be applied to multiple phases.

As described above, by performing the control to provide an inhibition period for a specific switching operation according to the second embodiment, it is possible to prevent level skipping of the line-to-line voltages and perform a control in which the cause of voltage error is less than that of the first embodiment, in an inverter system having an arbitrary number of phases and an arbitrary number of levels.

Although the present invention is detailed above only with reference to the specific embodiments, it is clear to those skilled in the art that various modifications can be made within the scope of technical substance of the present invention. Naturally, such modifications belong to the scope of the patent claims.

The invention claimed is:

1. An inverter system comprising:
a level skip prevention control section configured to output a gate signal based on a voltage level command, and drive an inverter by the gate signal;
wherein the level skip prevention control section is configured to:
in response to an upward shift of an output voltage level of a first one of phases, set a counter for inhibiting upward shifting of the output voltage level of the first phase during a predetermined duration, and set a counter for inhibiting downward shifting of an output voltage level of a second one of the phases other than the first phase during a predetermined duration; and
in response to a downward shift of the output voltage level of the first phase, set a counter for inhibiting downward shifting of the output voltage level of the first phase during a predetermined duration, and set a counter for inhibiting upward shifting of the output voltage level of the second phase during a predetermined duration.

2. The inverter system as claimed in claim 1, wherein the level skip prevention control section includes:
a level skip check and prevention section configured to output each of the output voltage levels and each of the counters, based on the voltage level command, a previous output voltage level, and a previous counter;
a first delay section configured to delay each of the counters by a control interval and output the delayed counter as the previous counter;
a second delay section configured to delay each of the output voltage levels by the control interval and output the delayed output voltage level as the previous output voltage level; and
a gate signal generation section configured to output the gate signal based on the output voltage levels.

3. The inverter system as claimed in claim 2, wherein the level skip check and prevention section is configured to, for each of the phases:
employ different counters including an upward shift inhibition counter and a downward shift inhibition counter respectively as the counter for inhibiting upward shifting and the counter for inhibiting downward shifting;
decrement the upward shift inhibition counter and the downward shift inhibition counter at intervals of the control interval;
compare the voltage level command with the previous output voltage level;
when the voltage level command is lower than the previous output voltage level,
check whether or not the downward shift inhibition counter is equal to zero,
when the downward shift inhibition counter is equal to zero, set the output voltage level of the each phase by a single downward step from the previous output voltage level, set the downward shift inhibition counter of the each phase, and set the upward shift inhibition counter of each of the phases other than the each phase, and
when the downward shift inhibition counter is not equal to zero, set the output voltage level of the each phase to be equal to the previous output voltage level;
when the voltage level command is equal to the previous output voltage level, set the output voltage level of the each phase to be equal to the voltage level command; and
when the voltage level command is higher than the previous output voltage level,
check whether or not the upward shift inhibition counter is equal to zero,
when the upward shift inhibition counter is equal to zero, set the output voltage level of the each phase by a single upward step from the previous output voltage level, set the upward shift inhibition counter of the each phase, and set the downward shift inhibition counter of each of the phases other than the each phase, and
when the upward shift inhibition counter is not equal to zero, set the output voltage level of the each phase to be equal to the previous output voltage level.

4. The inverter system as claimed in claim 2, wherein the level skip check and prevention section is configured to, for each of the phases:
employ a common counter as the counter for inhibiting upward shifting and the counter for inhibiting downward shifting;
decrement the common counter at intervals of the control interval, when the common counter is greater than zero;
increment the common counter at intervals of the control interval, when the common counter is less than zero;
compare the voltage level command with the previous output voltage level;
when the voltage level command is lower than the previous output voltage level,
check whether or not the common counter is greater than or equal to zero,
when the common counter is greater than or equal to zero, set the output voltage level of the each phase by a single downward step from the previous output voltage level, set the common counter of the each phase to a negative value, and set the common counter of each of the phases other than the each phase to a positive value, and
when the common counter is less than zero, set the output voltage level of the each phase to be equal to the previous output voltage level;
when the voltage level command is equal to the previous output voltage level, set the output voltage level of the each phase to be equal to the voltage level command; and
when the voltage level command is higher than the previous output voltage level,
check whether or not the common counter is less than or equal to zero,
when the common counter is less than or equal to zero, set the output voltage level of the each phase by a single upward step from the previous output voltage level, set the common counter of the each phase to a positive value, and set the common counter of each of the phases other than the each phase to a negative value, and
when the common counter is greater than zero, set the output voltage level of the each phase to be equal to the previous output voltage level.

5. A control method for an inverter system, wherein the inverter system includes a level skip prevention control section configured to output a gate signal based on a voltage level command, and drive an inverter by the gate signal, the control method comprising performing a process at the level skip prevention control section, wherein the process includes:
- in response to an upward shift of an output voltage level of a first one of phases, set a counter for inhibiting upward shifting of the output voltage level of the first phase during a predetermined duration, and set a counter for inhibiting downward shifting of an output voltage level of a second one of the phases other than the first phase during a predetermined duration; and
- in response to a downward shift of the output voltage level of the first phase, set a counter for inhibiting downward shifting of the output voltage level of the first phase during a predetermined duration, and set a counter for inhibiting upward shifting of the output voltage level of the second phase during a predetermined duration.

* * * * *